E. I. BRADDOCK.
FASTENING DEVICE.
APPLICATION FILED FEB. 1, 1908.

945,370.

Patented Jan. 4, 1910.

Witnesses.
C. H. Gannett
J. Murphy

Inventor.
Edward J. Braddock
by Jas. H. Churchill
atty.

UNITED STATES PATENT OFFICE.

EDWARD I. BRADDOCK, OF WINCHESTER, MASSACHUSETTS.

FASTENING DEVICE.

945,370.　　　　　Specification of Letters Patent.　　Patented Jan. 4, 1910.

Application filed February 1, 1908. Serial No. 413,760.

*To all whom it may concern:*

Be it known that I, EDWARD I. BRADDOCK, a citizen of the United States, residing in Winchester, in the county of Middlesex and State of Massachusetts, have invented an Improvement in Fastening Devices, of which the following description, in connection with the accompanying drawings, is a specification, like characters on the drawings representing like parts.

This invention relates to a fastening device of novel construction, which is especially adapted among other uses to be employed for fastening together the parts of packing or shipping boxes.

The fastening device is provided with two members, one of which may be termed the head member and the other the shank member. The head member is provided with a socket having screw-threads on its interior extended from its mouth the length of the said socket, and the shank member has its upper portion reduced in diameter and provided with screw-threads for a portion of its length below the upper end of said shank member. This construction enables the head member to be applied to or detached from the shank member in the least possible time as a limited number of turns of the head member suffices to engage the threaded socket with the threaded portion of the reduced end of the shank member, which reduced member is made of sufficient length to engage the bottom of the socket in the head member and thereby relieve the screw-threads from the effect of a blow upon the head member while being driven in. These and other features of this invention will be pointed out in the claims at the end of this specification.

Figure 1:
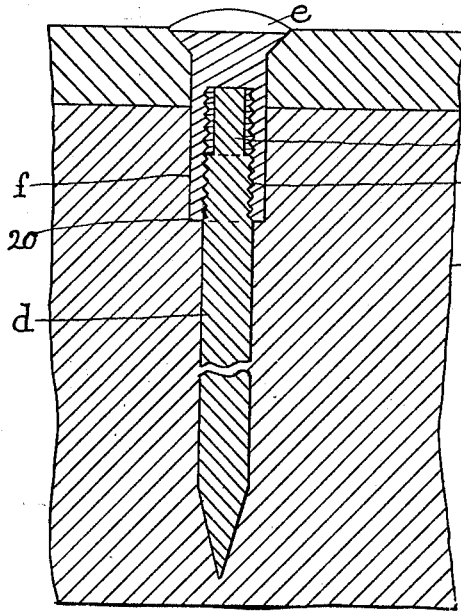
Figure 2:
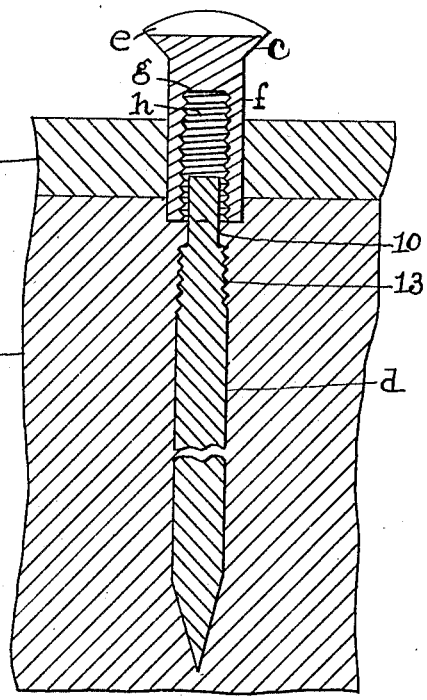
Figure 3:
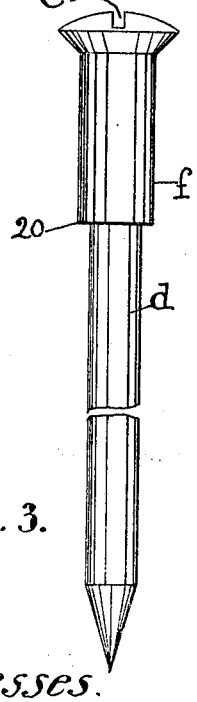
Figure 4:
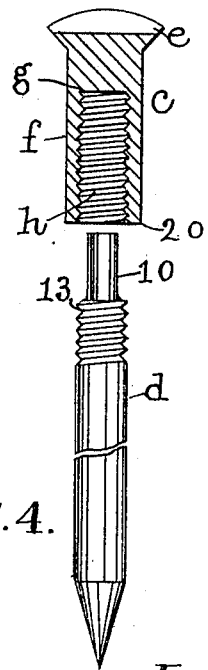

Figure 1 represents in section a portion of a packing case employing a nail embodying this invention. Fig. 2, a view like Fig. 1, showing the head member of the nail partially withdrawn from the cover. Fig. 3, a detail of the nail shown in Fig. 1, and Fig. 4, a detail in section and elevation of the nail shown in Fig. 3, with the parts separated.

Referring to the drawings $a$ represents a side and $b$ the cover of a wooden receptacle, such as a packing or shipping box or case, which are secured together by fastening devices embodying this invention.

The fastening device comprises two members $c$, $d$, which may be designated the head and shank members. The head member $c$ is provided with a slot $e$ for the reception of a screw-driver or other tool, and with an extension $f$ having a socket $g$, which is provided with screw-threads $h$ extended from the mouth of said socket the length of the latter for a purpose as will be described. The shank member is provided at its upper end with a reduced portion 10 and with screw-threads 13 which are below the end of the reduced portion so as to leave the latter smooth or unthreaded for a portion of its length (see Fig. 4). This construction enables the head member to be quickly and easily applied to and removed from the shank member as it requires only a few turns of the head member to engage the screw-threads $h$ with the screw-threads 13, and to disengage the same.

The reduced portion 10 is made of such length as to engage the bottom wall of the socket after a few of the screw-threads $h$ and 13, are engaged with each other, so that said screw-threads are relieved from the effect of a blow upon the head member, as the end of the reduced portion 10 engages the bottom wall of the socket and takes the full force of the blow (see Fig. 1).

The shank member may be provided with a smooth surface and a point similar to a nail or it may be of any other desired construction. The nail herein shown may be used after the manner of an ordinary nail, that is, it may be driven through the cover into the side of the box.

When it is desired to remove the cover, the head member may be unscrewed from the shank member (see Fig. 2) by a screw-driver or other tool, after which the cover can be removed from the box, leaving the head members in the cover and the shank members in the box, so that if it is desired to again use the box, it is only necessary to apply the cover thereto and turn the head members so as to engage the shank members. The engagement of the head member with the shank member can be effected in the least possible time, on account of the limited number of screw-threads required to effect the engagement and bring the end of the smooth reduced portion of the shank member into engagement with the bottom wall of the socket.

When it is desired to remove the shank member from the wood, the head member is turned back a few turns, sufficient to permit a claw hammer or other tool to be inserted under the head, after which the fastening device is withdrawn like an ordinary nail. When the fastening device is driven into the wood, the screw-threads are prevented from being jammed by the end of the shank member engaging the bottom wall of the socket.

The socketed head member is provided at its end with a substantially sharp or square edge 20, so as to effect a shearing cut in the wood when the nail is driven therein, and thereby avoid splitting the wood by the larger head. To facilitate construction, the socket in the head member is preferably threaded for substantially its entire length.

In replacing the cover b, the reduced portion 10 acts as a centering device for the socketed head member, thereby effecting a material saving in time in replacing the cover on the box.

Claims.

1. A fastening device comprising a metallic head member having an extension integral therewith and provided with a socket having screw-threads, and a shank member having a cylindrical reduced portion and provided with screw-threads for a portion only of its length below the end of said reduced portion, the latter being of a length sufficient to engage the bottom wall of said socket when the head member is screwed onto the shank member, substantially as described.

2. A fastening device comprising a metallic head member having an extension integral therewith and provided with a threaded socket and with a substantially sharp or square edge, and a shank member having a cylindrical reduced portion and provided with screw-threads for a portion only of its length below the end of said reduced portion, the latter being of a length sufficient to engage the bottom wall of said socket when the head member is screwed onto the shank member, substantially as described.

In testimony whereof, I have signed my name to this specification, in the presence of two subscribing witnesses.

E. I. BRADDOCK.

Witnesses:
JAMES H. CHURCHILL,
J. MURPHY.